US012664854B2

(12) United States Patent
Perrow et al.

(10) Patent No.: US 12,664,854 B2
(45) Date of Patent: Jun. 23, 2026

(54) TOUCH SCREEN CONTROLLER SYSTEM AND METHOD FOR A GAMING MACHINE

(71) Applicant: Aristocrat Technologies Australia Pty Limited, North Ryde (AU)

(72) Inventors: Shane Perrow, Kembla Heights (AU); Myron Dennison, Lane Cove (AU); Natalie Bryant, Cherrybrook (AU)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 295 days.

(21) Appl. No.: 18/181,308

(22) Filed: Mar. 9, 2023

(65) Prior Publication Data

US 2023/0290212 A1    Sep. 14, 2023

(30) Foreign Application Priority Data

Mar. 10, 2022    (AU) ................................ 2022201689

(51) Int. Cl.
| | |
|---|---|
| *G07F 17/00* | (2006.01) |
| *G06F 3/041* | (2006.01) |
| *G07F 17/32* | (2006.01) |
| G07F 17/34 | (2006.01) |

(52) U.S. Cl.
CPC ...... *G07F 17/3209* (2013.01); *G06F 3/04186* (2019.05); *G07F 17/3213* (2013.01); *G07F 17/3234* (2013.01); *G07F 17/34* (2013.01)

(58) Field of Classification Search
None
See application file for complete search history.

(56) References Cited

U.S. PATENT DOCUMENTS

| | | | | |
|---|---|---|---|---|
| 7,254,775 | B2 * | 8/2007 | Geaghan ............... | G06F 3/0488 |
| | | | | 715/701 |
| 8,493,355 | B2 * | 7/2013 | Geaghan ........... | G06F 3/041662 |
| | | | | 345/173 |
| 9,011,249 | B2 * | 4/2015 | Gagner ................... | G07F 17/32 |
| | | | | 463/40 |
| 9,489,068 | B2 * | 11/2016 | Niu ......................... | G06F 3/041 |
| 9,632,608 | B2 * | 4/2017 | Westerman ........... | G06F 3/0416 |
| 9,672,686 | B2 * | 6/2017 | Nguyen .............. | G07F 17/3225 |
| 9,804,707 | B2 * | 10/2017 | Durojaiye ........... | G06F 3/04186 |
| 9,891,732 | B2 * | 2/2018 | Westerman ......... | G06F 3/03547 |
| 9,927,902 | B2 * | 3/2018 | Burr ...................... | G06F 3/0488 |
| 9,996,251 | B2 * | 6/2018 | Feller .................... | G06F 3/0416 |
| 10,052,551 | B2 * | 8/2018 | Nguyen ................. | A63F 13/21 |
| 10,521,579 | B2 * | 12/2019 | Van Os ................. | G06F 1/1686 |

(Continued)

*Primary Examiner* — Paul A D'Agostino
(74) *Attorney, Agent, or Firm* — Armstrong Teasdale LLP

(57) ABSTRACT

Touch screen systems for a gaming machine receive touch input signals via touch screen hardware. A touch screen controller communicates with a gaming machine controller. The touch screen controller drives the touch screen device hardware to render and display video data received from the game machine controller, and detects and interprets touch inputs received via the touch screen hardware during display of the video data. The touch screen controller generates touch data for each touch input. The touch screen controller provides information on all touch inputs whether valid or invalid to the game controller, and the game controller is adapted to take action in relation to both valid and invalid touch inputs.

17 Claims, 7 Drawing Sheets

(56) References Cited

U.S. PATENT DOCUMENTS

| | | | | |
|---|---|---|---|---|
| 10,620,972 | B2 * | 4/2020 | Mattson | G06F 3/038 |
| 10,872,499 | B1 * | 12/2020 | Russ | G06F 3/011 |
| 10,969,903 | B2 * | 4/2021 | Zhang | G06F 3/0418 |
| 11,119,950 | B2 * | 9/2021 | Um | G06F 3/0631 |
| 11,211,945 | B1 * | 12/2021 | Lo | H03M 7/6023 |
| 2005/0259084 | A1 * | 11/2005 | Popovich | G06F 3/04886 |
| | | | | 345/173 |
| 2009/0005165 | A1 * | 1/2009 | Arezina | G07F 17/3244 |
| | | | | 463/37 |
| 2010/0113120 | A1 * | 5/2010 | Snow | G07F 17/32 |
| | | | | 463/16 |
| 2010/0156812 | A1 * | 6/2010 | Stallings | H04M 1/72412 |
| | | | | 345/173 |
| 2010/0245258 | A1 * | 9/2010 | Stewart | G06F 3/03547 |
| | | | | 345/173 |
| 2010/0273533 | A1 * | 10/2010 | Cho | G06F 3/04886 |
| | | | | 345/173 |
| 2011/0227872 | A1 * | 9/2011 | Huska | G06F 3/016 |
| | | | | 345/174 |
| 2011/0250972 | A1 * | 10/2011 | Horbay | G06Q 10/10 |
| | | | | 463/42 |
| 2012/0105481 | A1 * | 5/2012 | Baek | G06F 3/04886 |
| | | | | 345/173 |
| 2013/0296053 | A1 * | 11/2013 | Rasmussen | G07F 17/3216 |
| | | | | 463/31 |
| 2014/0267108 | A1 * | 9/2014 | Chung | G06F 3/041661 |
| | | | | 345/173 |
| 2014/0274372 | A1 * | 9/2014 | Rosander | G07F 17/3209 |
| | | | | 463/31 |
| 2014/0327630 | A1 * | 11/2014 | Burr | G09G 5/006 |
| | | | | 345/173 |
| 2015/0024841 | A1 * | 1/2015 | Montenegro | G07F 17/3211 |
| | | | | 463/31 |
| 2015/0153865 | A1 * | 6/2015 | Westerman | G06F 3/041 |
| | | | | 345/173 |
| 2015/0331534 | A1 * | 11/2015 | Feng | G06F 3/017 |
| | | | | 345/173 |
| 2016/0189494 | A1 * | 6/2016 | Levesque | G06F 3/016 |
| | | | | 340/407.1 |
| 2016/0203415 | A1 * | 7/2016 | Chaiyochlarb | G06F 3/04817 |
| | | | | 706/11 |
| 2016/0224115 | A1 * | 8/2016 | Olien | G06F 3/04883 |
| 2018/0181253 | A1 * | 6/2018 | Takahashi | H04N 23/631 |
| 2019/0094957 | A1 * | 3/2019 | Nelson | A63F 9/24 |
| 2020/0167028 | A1 * | 5/2020 | Morrison | G06F 3/0448 |
| 2021/0278952 | A1 * | 9/2021 | Yoshida | H04N 23/631 |
| 2021/0406832 | A1 * | 12/2021 | Tennur Narayanan | G06F 11/302 |

* cited by examiner

300

| Reel position | Reel 1 | Reel 2 | Reel 3 | Reel 4 | Reel 5 |
|---|---|---|---|---|---|
| | 321 | 322 | 323 | 324 | 325 |
| 1 | Pic 1 | 10 | Pic 3 | Q | Pic 1 |
| 2 | Wild | Q | K | A | 10 |
| 3 | J | K | 10 | 10 | A |
| 4 | Q | A | Q | Pic 2 | Pic 2 |
| 5 | 10 | Pic 2 | K | J | A |
| 6 | A | 9 | Pic 1 | Wild | Q |
| 7 | Pic 2 | Wild | J | 9 | K |
| 8 | A | Pic 3 | K | 10 | Pic 2 |
| 9 | Q | Q | 9 | A | 9 |
| 10 | K | 10 | Q | Q | Wild |
| 11 | J | A | 10 | J | 9 |
| 12 | 10 | Wild | Wild | K | Q |
| 13 | Pic 3 | K | A | Wild | 10 |
| 14 | Wild | J | A | Pic 3 | Wild |
| 15 | 9 | 10 | Wild | Pic 1 | A |

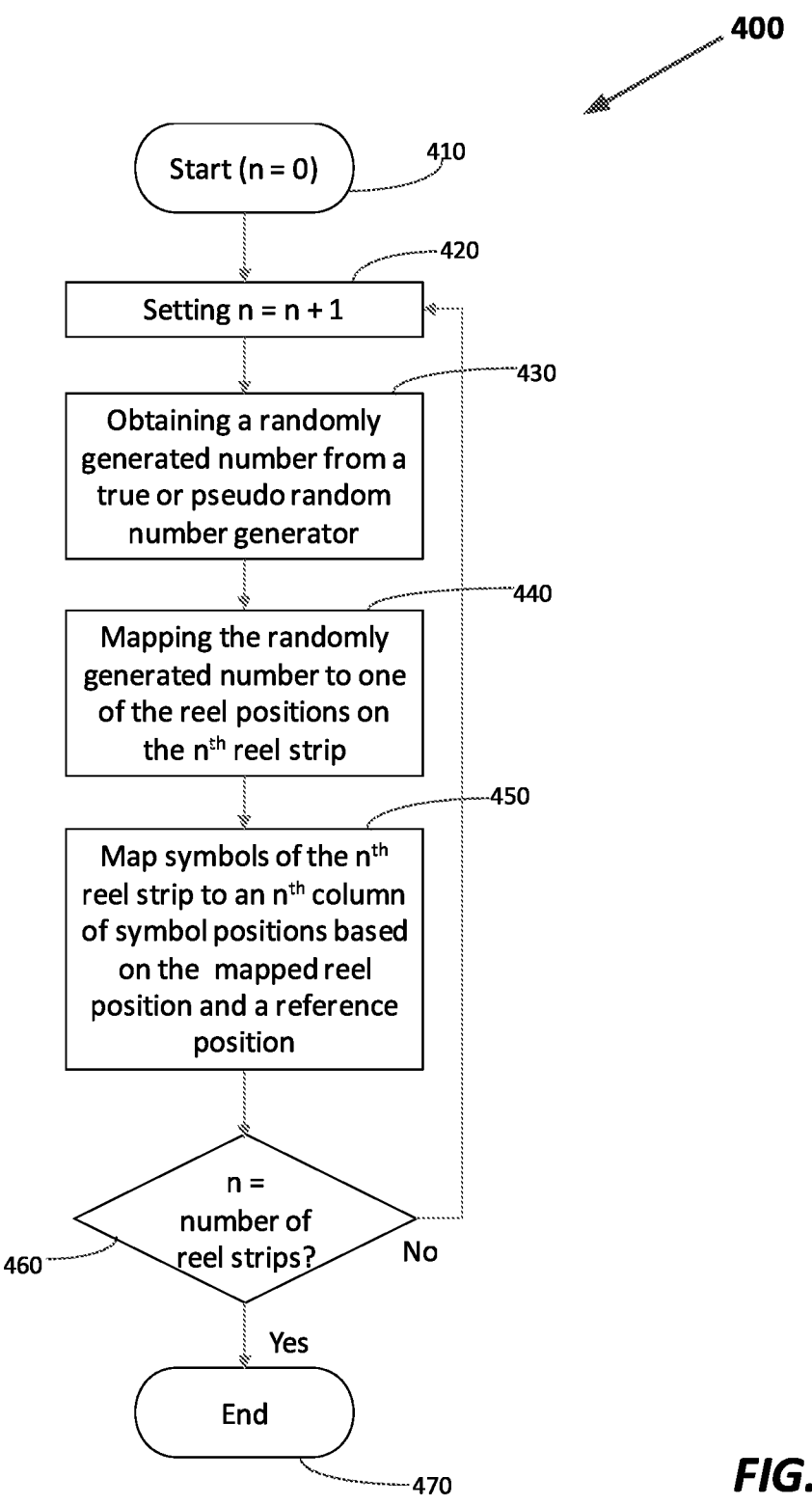

Start (n = 0)  — 410

Setting n = n + 1  — 420

Obtaining a randomly generated number from a true or pseudo random number generator  — 430

Mapping the randomly generated number to one of the reel positions on the $n^{th}$ reel strip  — 440

Map symbols of the $n^{th}$ reel strip to an $n^{th}$ column of symbol positions based on the mapped reel position and a reference position  — 450 n = number of reel strips?  — 460

No

Yes

End  — 470

*FIG. 4*

TOUCH SCREEN CONTROLLER SYSTEM AND METHOD FOR A GAMING MACHINE

CROSS REFERENCE TO RELATED APPLICATIONS

This application claims the benefit of priority to Australian Patent Application No. 2022201689, filed Mar. 10, 2022, which is incorporated herein by reference in its entirety.

TECHNICAL FIELD

The present application relates to a touch screen controller system for an electronic gaming machine and a method of processing touch inputs using the touch screen.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Touch screens are often used as a component for enabling player inputs, for example to select games to play, amount to wager, initiate game rounds, and input instructions during gameplay. These inputs are typically made by tapping a relevant area of the screen using a finger. However, in addition to intentional and valid inputs, erroneous or accidental inputs may also be received, for example by leaning or brushing against the screen or for table games, or by leaning a hand, elbow or drink on the screen. There is a need to handle valid and invalid touch inputs in the context of the gaming machine operation.

SUMMARY

Embodiments of the present invention relate to touch screen systems for gaming machines, adapted to provide information on all touch inputs (whether valid or invalid) to the game controller, and the game controller is adapted to take action in relation to both valid and invalid touch inputs. An advantage of this system is the game controller can appropriately control or pause game play when touch input errors occur.

In one aspect, a gaming machine touch screen system is provided. The gaming touch screen system includes touch screen device hardware and a touch screen controller configured for data communication with a game controller of a gaming machine. The touch screen controller is configured to receive video data signals from the game controller, drive the touch screen device hardware to render and display the received video data, detect and interpret touch inputs received via the touch screen hardware during display of the video data to generate touch data for each touch input, and output touch data to the game controller. The touch data output to the controller for each touch input includes data indicative of the interpretation of the touch screen input and data representative of one or more attributes of the detected touch input.

In another aspect, a gaming machine is provided. The gaming machine includes a game controller and a touch screen system including touch screen device hardware and a touch screen controller in data communication with a game controller of the gaming machine. The touch screen controller is configured to receive video data signals from the game controller, drive the touch screen device hardware to render and display the received video data, detect and interpret touch inputs received via the touch screen device hardware during display of the video data to generate touch data for each touch input, and output touch data to the game controller. The touch data output to the controller for each touch input includes data indicative of the interpretation of the touch screen input and data representative of one or more attributes of the detected touch input. The data indicative of the interpretation of the touch screen input is indicative of a player input. The game controller controls game play responsive to the player input and the data indicative of the interpretation of the touch screen input is indicative of an input other than a player input. The game controller determines a response action based on the data indicative of the interpretation of the touch screen input and data representative of one or more attributes of the detected touch input.

In another aspect, a method of operating a gaming machine is provided. The gaming machine includes a game controller and a touch screen system including touch screen device hardware and a touch screen controller in data communication with a game controller of the gaming machine. The method includes the touch screen controller receiving video data signals from the game controller, driving the touch screen device hardware to render and display the received video data, detecting and interpreting touch inputs received via the touch screen device hardware during display of the video data to generate touch data for each touch input, and outputting touch data to the game controller. The touch data output to the controller for each touch input includes data indicative of the interpretation of the touch screen input and data representative of one or more attributes of the detected touch input.

BRIEF DESCRIPTION OF THE DRAWINGS

FIG. 3 illustrates an example reel strip layout in accordance with an example embodiment of the present disclosure.

FIG. 4 is a flow chart of a symbol selection method in accordance with an example embodiment of the present disclosure.

DETAILED DESCRIPTION

Figure 1:
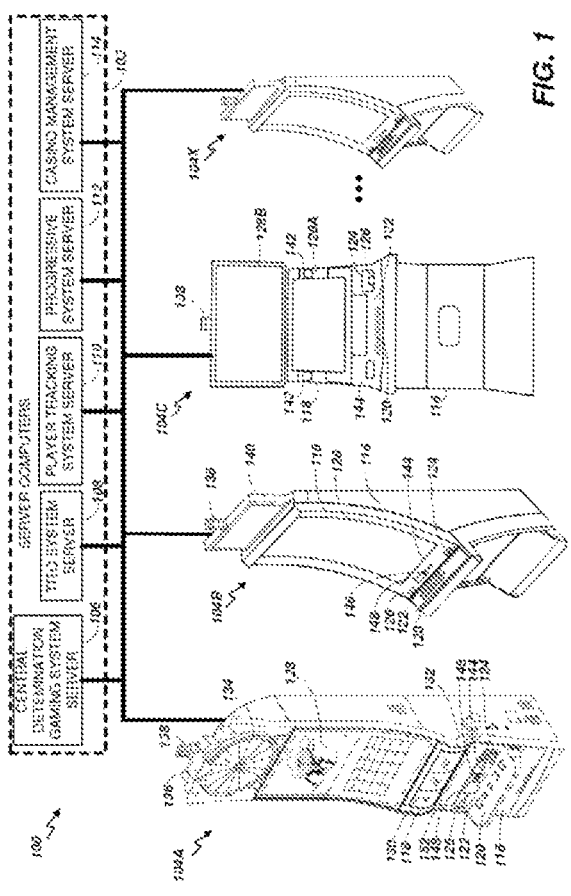
FIG. 1 is an exemplary diagram showing several EGMs networked with various gaming related servers.

The systems and methods described herein relate generally to electronic gaming, and more particularly, to a touch screen controller system and method for a gaming machine wherein the touch screen controller is configured to output touch data to a game controller, and the touch data includes an indicator of whether the inputted touch data (inputted by a user) was a valid input or an invalid input. More specifically, the gaming machine touch screen system described herein includes touch screen device hardware, and a touch screen controller that is configured for data communication with a game controller of the gaming machine. The touch screen controller is configured to receive video data signals from the game controller, drive the touch screen device hardware to render and display the received video data, detect and interpret touch inputs received via the touch screen device hardware during display of the video data to generate touch data for each touch input, and output touch data to the game controller, wherein the touch data output to the controller for each touch input includes: data indicative of the interpretation of the touch screen input; and data representative of one or more attributes of the detected touch input.

In addition, the gaming machine touch screen system is configured to interpret the touch screen input by assessing whether a touch input is a valid or invalid touch input. The gaming machine touch screen system controller is configured to output touch data to the game controller for all valid and invalid touch inputs. The data being indicative of the interpretation of the touch screen input includes an indicator of whether the touch input is assessed as valid or invalid. And the one or more attributes of the detected touch input include any one or more of: touch area, touch shape, touch dimensions, touch edge coordinates, touch intensity, timing, and touch persistence.

The present disclosure describes an electronic gaming machine system that provides a technical solution to at least several technical problems. Touch screens are often used as a component to a gaming machine for enabling players to easily input certain data. However, the fact that touch screens enable easy input of player data by allowing a player to just merely touch the screen to input data may also be a technical problem in some cases. For example, when a player or another person near the machine accidently touches the touch screen during game play, this accidental touching may be detected by the touch screen as a player input even though it was merely an accidental touching. At least some known touch screen devices are unable to decipher between an actual, legitimate touching of the screen for a legitimate data input versus an accidental touching that was not intended as an input. In these cases, where the touch screen is unable to decipher between an intended touch versus an unintended touch, the results can be quite problematic. For example, in some cases, an unintended input is entered into the gaming machine causing a different or unintended outcome, such as the wrong game is selected for play; the wrong amount is wagered; the wrong cards are selected; the wrong player input is entered. The systems and methods described herein address these problems by providing a touch screen controller that is intelligent and is configured to determine which touch screen inputs are valid (e.g., intended) and which touch screen inputs are invalid (e.g., accidental or unintended).

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any or a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
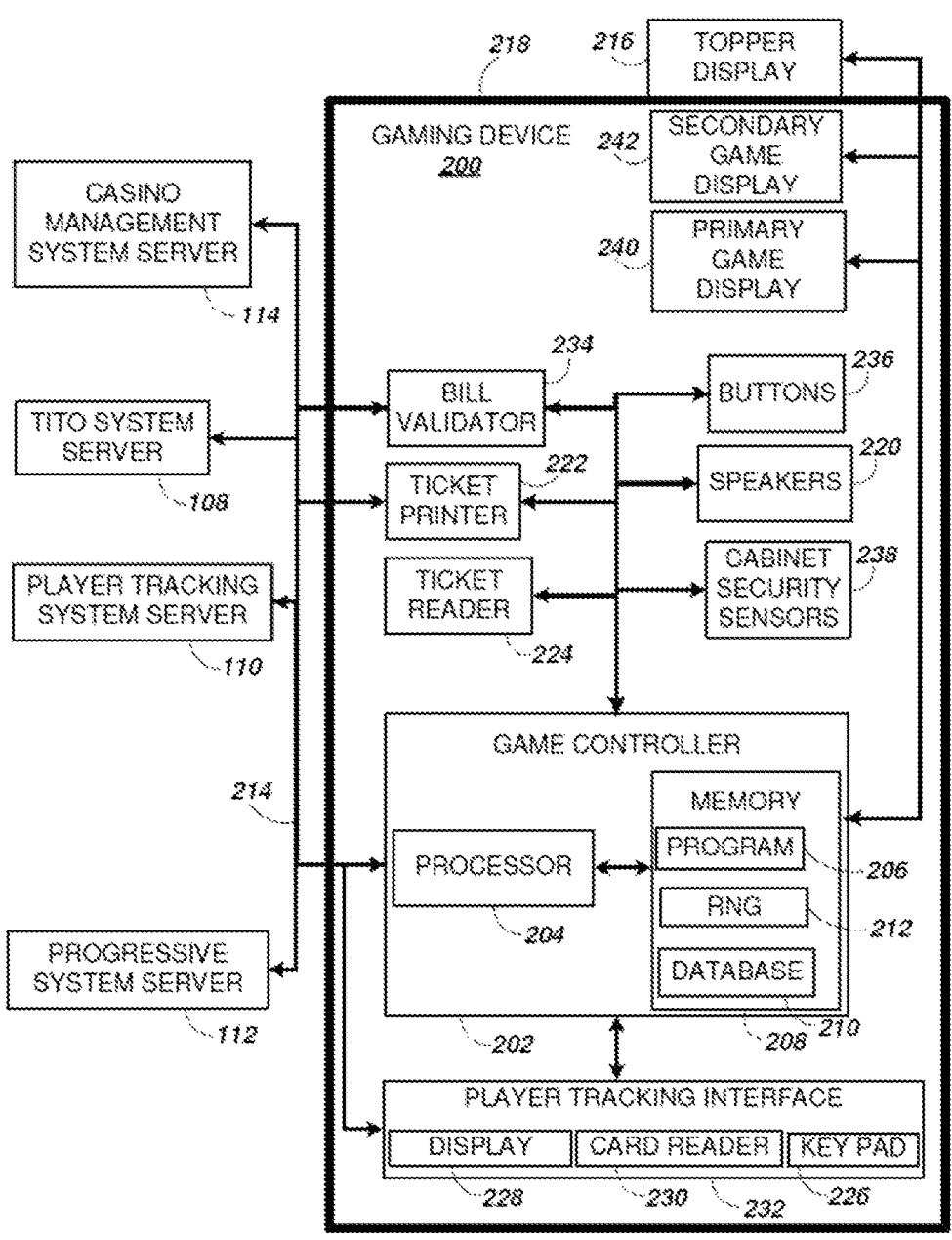
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B. In some embodiments this main display 128 may be a touch screen or include a touch screen portion to enable player inputs by touching the display.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments the main display 128A may be a touch screen or include a touch screen portion to enable player inputs by touching the display. In some embodiments the secondary display may also be a touch screen or include a touch screen portion.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips 321, 322, 323, 324, 325. In the example, each reel strip has thirty reel strip positions 301-330 (e.g., 301-315 are shown). Each reel strip position of each reel has a symbol. For example, a "Wild" symbol 331 occupies the six reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic 3" symbol 343 is mapped to a bottom symbol position, "10" symbol 342 is mapped to a middle symbol position, and "J" symbol 341 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

Embodiments of the present invention concern specifically touch screen systems for gaming machines and operations of the gaming machine controller in the instances of invalid touch inputs. In some gaming machine embodiments at least one display is a touch screen type display or includes a touch screen area. For example, any one or more of the primary game display 240, secondary game display 242, and player tracking interface display may be (or include) a touch screen. Players use the touch screen to input instructions for game play. However, gaming can be an environment where erroneous inputs are common, for example due to leaning a hand or elbow on the touch screen, or placing an object, such as a purse or drink, on part of the screen. Even spills or smears, from food or liquids, may cause erroneous inputs. In the highly regulated gaming environment it is important that such touch input errors are handled in a controlled way.

Figure 5:
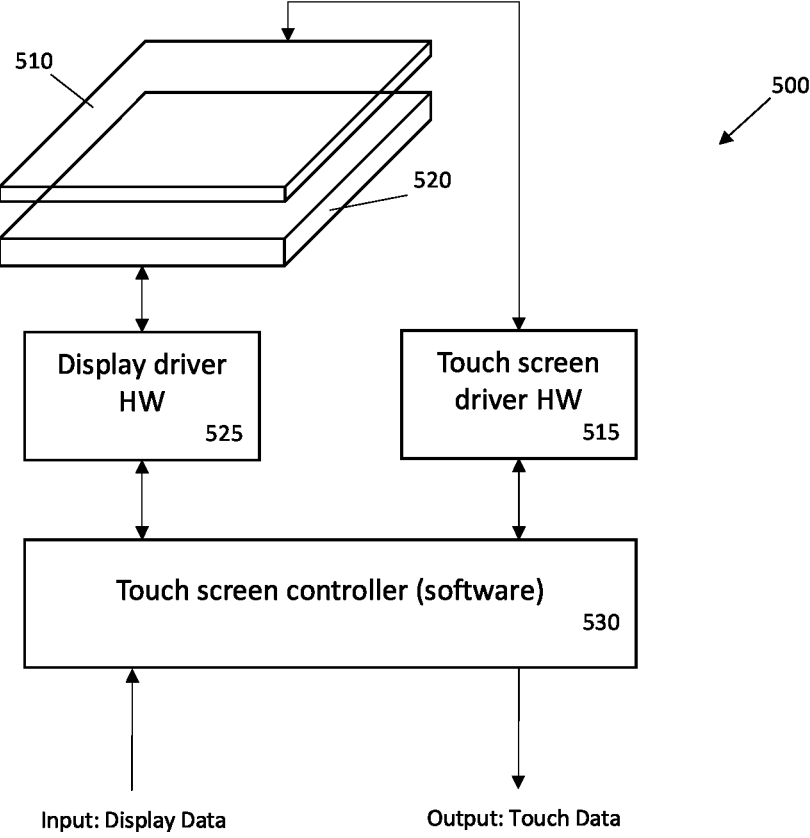
FIG. 5 is an overview of a touch screen system in accordance with an example embodiment of the present disclosure.

To aid understanding of the problem and solution of the present invention, we provide a very brief overview of touch screen systems. FIG. 5 illustrates a conceptual block diagram of an example of a touch screen system in accordance with the present disclosure. Touch screen systems 500 include a touch screen panel 510 having a sensor layer, superimposed on (or in some system integrated with) a display 520 (for example an LED or liquid crystal display), with corresponding display driver 525 and touch screen driver 515 hardware, controlled by touch screen controller 530 software. Touch screen controller 530 receives display data (for example gaming video imagery output by the game controller) to render for display, and outputs touch data based on processing detected touch inputs on the touch panel 510. Timing of displayed data and touch detection can be used to interpret the user input—for example to determine which displayed icon or symbol was touched. This touch data is output to the game controller in a gaming machine system.

Touch screen driver hardware 515 drives the touch screen sensors, which generate electrical signals in response to touches on the touch screen panel surface, and receives sensor signals which are processed and interpreted by touch screen controller software 530. For example, for a projected capacitive (PCAP) touch screen system, a network of electrodes project an electromagnetic field through a protective glass layer, alterations in this electromagnetic field (e.g., due to the presence of a finger) affect the electrical signals at the electrodes from which the position (i.e., X and Y coordinates) of the alteration (and therefore touch) is identified by the touch screen driver and input to the touch screen controller including location of the touch inputs. The touch screen controller processes the sensor outputs to interpret into touch data, which can include an indication of the nature of the touch input. For example, which displayed icon was selected, or the input touch command (i.e., swipe). Touch screens can utilize a variety of touch sensor technologies, including resistive, capacitive, infra-red, optical and surface acoustic wave, all of which are contemplated within the scope of the present invention. Some sensor technologies may also be responsive to matter other than human touches, for example other matter on or proximate (but not necessarily touching) the screen.

Common touchscreen systems today, allow a touch screen controller device to 'filter out' invalid touch events such as palms, foreign objects and cans placed on the touchscreen sensor. These objects and items are deemed 'invalid' by the touch controller and hence typically the touch system simply masks out that region of the touch system while that object remains. For example, where touches are outside an area where a button or icon is displayed, these may be deemed invalid touches.

In another example, an intentional finger touch covers an area of the screen, the touch screen controller therefore can interpret a touch coving an area within the range of a typical finger size as a valid touch input. A very small area touch detection (for example, due to a drop of liquid, dust, or part of a finger impinging on the edge of the screen) may be assessed as invalid. For example, based on a comparison with typical finger touch input size, or threshold size analysis. Similarly, a large touch input, bigger than a typical finger touch, for example caused by a palm or smear, may also be assessed as invalid by the touch screen controller.

For invalid touches a conventional touch screen controller will typically not provide the touch input data to the software application operating on the device at all, discarding the invalid touch information by the touch system controller.

Some touch screen controllers will treat the area of the identified invalid touch as an invalid area, masking this area. The masking may be while the invalid touch remains, or for a period of time, which may be preset in the touch screen controller. This means that this masked area is excluded from touch processing for a period of time. Alternatively, any touch detected within that area is automatically deemed invalid due to the masking triggered by an earlier invalid touch input.

If an invalid touch input persists (such as a drop of liquid, dust or a smear on the screen) the touch screen controller may extend the duration of the masking, leaving an area unresponsive. Depending on the settings configured in the touch screen controller, the time the area remains unresponsive may be unacceptably long, leading to missed inputs and user frustration.

Sections of the display being masked can lead to unpredictable operation of applications running on the device, for example due to missing inputs, time outs, or misinterpretation of inputs by the software application running on the device. In a gaming machine, unpredictable operation may cause the machine to operate outside strict regulations, which is unacceptable and result in the machine having to shut down or be taken out of service.

In this invention and system, the touch controller passes all touch events (both valid and invalid touch events) from the sensor up to the software layers, for analysis by the game controller, allowing the gaming machine to react and behave being more informed about all of the objects on the touch sensor.

Embodiments provide a touch screen system for a gaming machine having touch screen device hardware (including drivers) and a touch screen controller which is adapted to communicate with the game controller. The touch screen controller receives video data from the game controller to render on the display. Touch inputs on the touch screen are detected via the touch screen hardware and interpreted by the touch screen controller to provide touch data, which can be output to the game controller. The touch data for each touch includes data indicative of the interpretation of the touch screen input (for example, touch detected on a displayed icon or symbol, or touch command, such as a swipe), this can also include an indicator of whether a touch input was considered valid or invalid. The touch data also includes and data representative of one or more attributes of the touch input.

The data representative of attributes of the touch input can include parameter values from the original detected touch signal or other data characterizing the original detected touch signal. Thus, the game controller software is able to utilize this data from the original touch input, instead of or in addition to the processed interpretation of the touch input output from the controller. For example, the attributes, of which any one or more may be provided, can include the location of the touch input, area, dimensions, edge data, intensity, timing, duration, or persistence of the touch input. As a minimum some of this additional attribute data may be logged by the game controller. In some embodiments the additional attribute values may be utilized to control operation of the game play when invalid touch inputs occur.

Traditional PCAP Touchscreen environments place complete trust in the touchscreen controller to 'filter out' invalid touch items such as cans and palms. The gaming industry presents a more regulated environment and higher level of quality expectation on such technology, given the gambling and money handling function that our cabinets provide. The proposed solution allows for higher order software layers to behave accordingly when a foreign object is placed on the touch sensor (as opposed to just accepting that a portion of the touch screen is masked and non-functional by the touch controller).

COVID has introduced various new environmental conditions for gaming machine products to deal with. Particularly problematic is regular, periodic cleaning during gaming room operating hours, causing the addition of various and regular cleaning agents and solvents applied to touch screen products—all while powered on and continuing the expectation of normal and uninterrupted operation. These cleaning agents can present a challenge to PCAP (and other) touch systems, as they generally present as a liquid spill and foreign object, and hence touch controllers traditionally mask such areas from functionality—sometimes for hours after the agent has been dried off.

Figure 6:
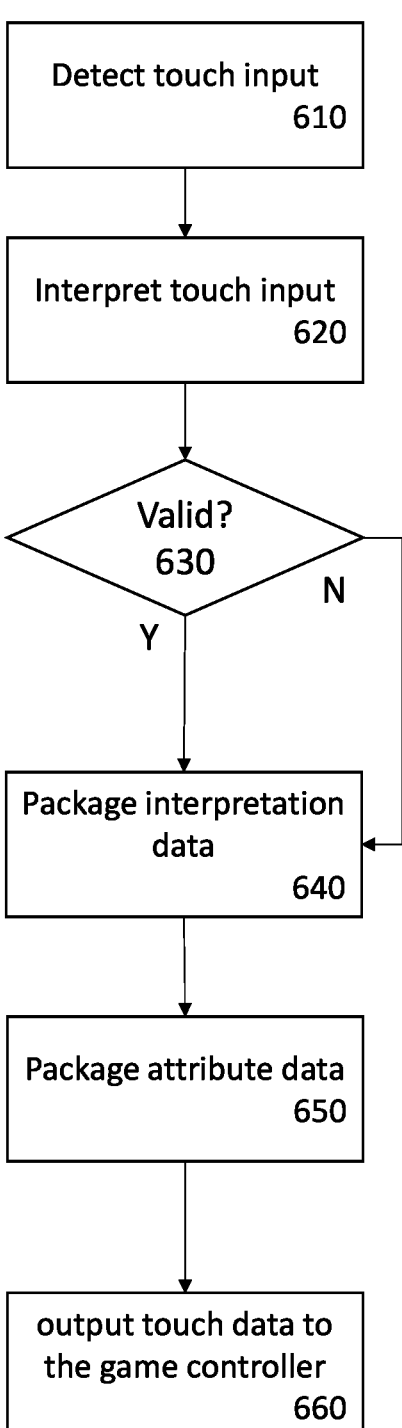
FIG. 6 is a flowchart illustrating an example of a touch screen controller process in accordance with an example embodiment of the present disclosure.

In embodiments of the present invention, the touch screen controller is modified to pass on additional information to the game controller in relation to touch inputs. An example of a method of operation by the touch screen controller is illustrated in FIG. 6. The touch screen controller detects a touch input using conventional touch detection at step 610. The touch screen controller then processes the touch input to interpret the touch input 620. The touch screen controller can perform conventional processing to interpret the touch input. Interpretation of the touch input can include any one or more of:

identification of the nature of the input, for example, a static touch on the screen, a swipe, double tap, and identifying a location or region of the display, for example identifying the symbol, icon or other object interacted with on the display.

Interpretation of the touch input 620 can be based on attributes of the touch which are also captured at this step, for example:

physical attributes of the touch input, such as area of the touch, shape, outline, dimensions, temporal information regarding the touch, for example is this brief (shorter than a threshold period of time), dynamic (moving), long (sustained longer than a threshold period of time), persistence (sustained for a significantly long period of time, this may also include being static for this time—i.e., indicative of an object or substance on the touch screen rather than a human interaction), and intensity or impact of the touch, where the sensor technology used in the touch screen hardware outputs a variable signal dependent on the nature of the interaction. For example, a capacitive detection system may output a different signal level for a human hand or finger interaction with the touch screen to that of an object or liquid on the screen. Such information can be of use to the game controller.

Interpreting the touch input 620 can include the same analysis of detected touch inputs to distinguish between valid and invalid touch inputs 630 as conventional touch screen controllers. However, in embodiments of the present touch screen controller, touch inputs considered invalid are not blocked, rather these are passed to the game controller to enable the game controller to determine whether or not to discard the invalid input. An outcome of the validity assessment in embodiments of the touch screen controller may be setting a flag indicating the validity status for the touch input, this flag value to be packaged in the data signal used by the touch screen controller to provide touch data to the game controller.

The touch controller assessing whether the touch input is valid or invalid may also be an optional step. Where the touch screen controller is configured to not make a validity assessment, attributes of the touch signal may be utilized by the game controller to determine a response to the touch input, which may include a validity determination by the game controller.

Interpretation data 640 and attribute data 650 for one or more attributes together form the touch data packaged into the touch signal provided to the game controller 660. A signal protocol may be defined for efficient transfer of touch data. It should be appreciated that this may vary between embodiments based on the game controller requirements. Nature of the touch screen sensor technology may also cause variation in the attribute data applicable for different embodiments.

The game controller controls game play in accordance with game code executing on the game controller processor. The touch data conveys player inputs (for example, wager, game, payline, symbol selection, play option, and play initiation instructions) to the game controller to control game play. The game controller can also be enabled to control operation of game play in consideration of invalid inputs. In particular, in relation to invalid inputs, the additional information enables the game controller to further analyze the nature of the invalidity. Thus, providing additional information regarding each touch input can provide additional functionality within the game controller. Some of these features are discussed in the paragraphs below.

Figure 7:
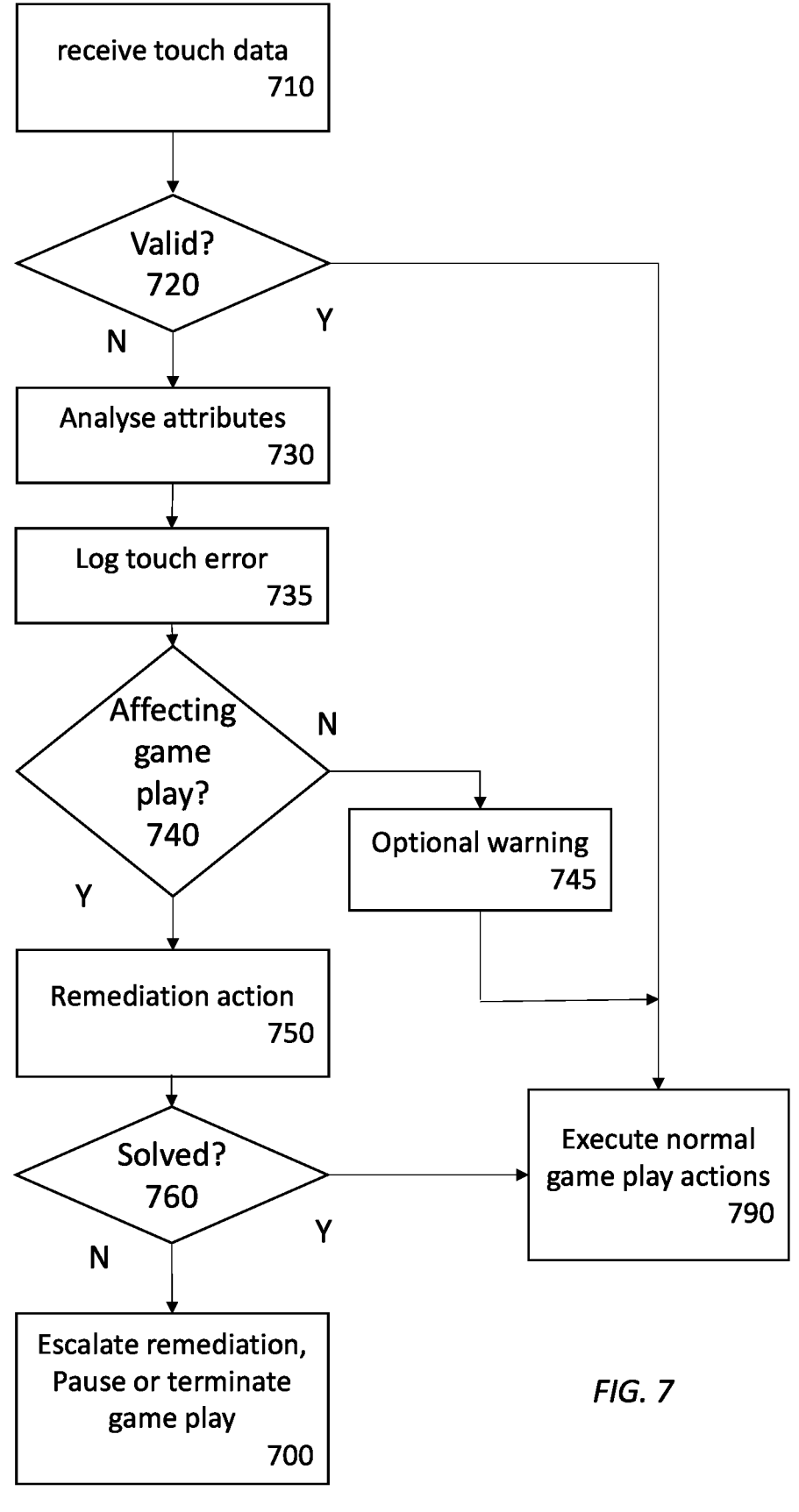
FIG. 7 is a flowchart illustrating an example of a game controller process in accordance with an example embodiment of the present disclosure.

FIG. 7 is a flowchart of an example of a process executed by the game controller in response to receiving the touch data signal. The game controller receives the touch data 710 and determines whether the touch data indicates a valid or invalid touch input 720. This analysis may be based on a validity flag included in the touch data by the touch controller or be otherwise based on the touch interpretation data. For example, where the touch interpretation data indicates a command, such as a swipe or a symbol selection, which is expected by the game controller, then this will be assessed as a valid input. Where the touch input is unexpected within the context of the game execution, the game controller can analyze the additional touch attributes 730 to determine an appropriate action. The touch error may also be logged 735 for tracking and analysis purposes. For example, storing the touch data (including attribute data) and associated relevant timing and game data in a log file or database. The touch attributes enable the game controller to assess the invalid input and determine whether or not this may impact game play or performance of the gaming machine 740.

The attributes, of which any one or more may be provided, in addition to the processed touch input, can include the location of the touch input, area, dimensions, edge data, intensity, timing, duration, or persistence of the touch input. For example, the coordinate position of the center of the touch input may be provided. The area, and or dimensions, of the touch input may also be provided. Alternatively, or additionally, coordinates of points along the edges of the touch input. This may be useful for very large touch inputs such as a whole hand, purse, or drink. Depending on the nature of the touch screen technology, signals from the touch detection sensors may indicate the intensity of the touch the touch screen controller may be able to distinguish between types of interactions on this basis—for example distinguish between a person resting against a touch screen and a liquid spill based on the difference in signal intensity.

The game controller can determine whether the touch error input may have an impact on game play 740. For example, a hand or drink resting on an area of the touch screen display that is not currently actively being used in the executing game play, may not affect game play. Thus, the game controller can continue executing normal game play actions 790. Optionally, a warning may be issued 745, for example the game controller may control the display to display a warning message. The warning message may be based on the detected nature of the error, for example "please avoid resting hands on the screen" or "please remove your drink from the touch screen area". Alternatively, the warning may be transmitted to a central control server or staff terminal to advise gaming floor management or staff of a potential problem, for example, identifying a machine that may require touch screen cleaning, investigation, or other manual intervention.

Where the touch error is assessed as affecting game play 740 the game controller can be programmed to perform a remediation action. For example, game play may be temporarily paused, and a message displayed to instruct the player of an action to remove the touch input error which is affecting game play. Once the object is removed game play can execute as normal 790. Informative messaging to players about touchscreen objects potentially affecting gameplay. For example, "Please remove your drink from the button deck to continue playing". This type of informative messaging may be highly advantageous in highly regulated gaming environments—such as Macau.

In some instances a touch error may not affect game play immediately (for example if the error is in an area of the touch screen not currently active or not in use for current game play, but is likely to cause problems in an upcoming period of game play (for example an input area for player commands for a feature game during base game play), game play may continue to execute normally, with a warning issued identifying the future problem. For example, "max bet disabled until obstruction removed from screen" or "feature panel obstructed, feature game cannot proceed until feature panel is cleared", thus providing the player and/or gaming floor staff with a remediation opportunity before game play is affected.

In another example, the game controller may record information regarding a touch input error (for example identification of a smear or liquid on the screen surface)

which may interfere with a touch input signal but based on this knowledge valid touch inputs within this error area can be distinguished, for example based on signal threshold attributes. Thus, the game controller may store this information for ongoing analysis of inputs. For example, this ongoing analysis may include the game controller software filtering the touch error from legitimate inputs to enable normal game play to continue 790. Optionally an error message may be sent to a central management server to advise gaming floor staff that cleaning is required.

If an error cannot be remediated, then game play may be paused or terminated, and an error message displayed 700.

In some embodiments the game controller may implement a sequence of remediation actions or reduction in game play functionality if touch errors continue to occur or escalate. For example, where a spill or smear grows (such as from condensation or multiple drink rings or hand prints, or bumping of an object such as a purse or jacket to progressively cover more of the screen), thus increasing the severity of the touch input error, the game controller of some embodiments is configured to escalate remediation actions. This may include limiting functionality or locking up game play functions in a controlled manner. The nature of the action can vary with the type of game played and severity of the touch error.

Controlled and Predictable EGM behavior when large or foreign objects are placed on touch sensors (rendering those sections non-functional) is particularly advantageous. For example, there may be several metrics of severity that the gaming machine uses to potentially gracefully lockup or suspend reel spins (such as the size, position or duration of the time that an invalid object has been placed on the button deck). For example, if ~20% of the sensor area is detecting a large and persistent foreign object for x Seconds—the EGM may lockup with a 'touchscreen lockup' flagging for an attendant to service the issue (by perhaps cleaning, drying or otherwise remedying the problem area).

The game controller receiving the additional information also enables enhanced field diagnostics, for example by improving the current touch screen diagnostic test—This test is used by field technicians to test the touch system on the cabinet, and this solution can be used to depict 'invalid' touch items being detected by the sensor—such as transparent cleaning agents. For example, live touch input data may be converted by the game controller to a visual representation, to visually display a map of areas of the touch screen showing input errors—for example a heat map or contour line style image. This is particularly advantageous where invalid touches are caused by liquid spills, smudges, or cleaning agent residue that may not be easily perceived by observation. A similar visualization technique may also be used to visually feedback the touch screen response—for example to identify any areas of the touch screen with reduced sensitivity indicating potential hardware faults.

This system also enables enhanced data logging—where touch screen input data, including input error data is recorded. This solution can be used to build knowledge on how the gaming machine products are used (where hands a rested, drinks are placed etc.) or to aid in field fault investigations. For example, the logged data may also be used to audit the touch screen performance or identify timing of a fault occurrence—for example to identify timing of covert malicious interference with the touch screen hardware for investigative purposes.

Having access to data regarding real user interaction with the touch screen surfaces may also provide insights to feed forward into game and gaming machine design. It should be appreciated that such data would be otherwise unavailable, or only obtainable via observation or user survey which typically provide sparse data sets for analytics compared with directly logged user data.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Clause 1: A gaming machine touch screen system comprising:

touch screen device hardware; and a touch screen controller configured for data communication with a game controller of a gaming machine, the touch screen controller being configured to:

receive video data signals from the game controller;

drive the touch screen device to render and display the received video data;

detect and interpret touch inputs received via the touch screen hardware during display of the video data to generate touch data for each touch input; and output touch data to the game controller;

wherein the touch data output to the controller for each touch input includes: data indicative of the interpretation of the touch screen input; and data representative of one or more attributes of the detected touch input.

Clause 2: The gaming machine touch screen system of clause 1, wherein interpreting the touch screen input includes assessing whether a touch input is a valid or invalid touch input.

Clause 3: The gaming machine touch screen system of clause 2, wherein the touch screen controller is configured to output touch data to the game controller for all valid and invalid touch inputs.

Clause: 4 The gaming machine touch screen system of clause 3, wherein the data indicative of the interpretation of the touch screen input includes an indicator of whether the touch input is assessed as valid or invalid.

Clause 5: The gaming machine touch screen system of clause 4, wherein the one or more attributes of the detected touch input include any one or more of: touch area, touch shape, touch dimensions, touch edge coordinates, touch intensity, timing, and touch persistence.

Clause 5: A gaming machine comprising:

a game controller; and a touch screen system comprising:

touch screen device hardware; and a touch screen controller in data communication with a game controller of a gaming machine, the touch screen controller being configured to:

receive video data signals from the game controller;

drive the touch screen device to render and display the received video data;

detect and interpret touch inputs received via the touch screen hardware during display of the video data to generate touch data for each touch input; and output touch data to the game controller;

wherein the touch data output to the controller for each touch input includes: data indicative of the interpretation of the touch screen input; and data representative of one or more attributes of the detected touch input, and wherein where the data indicative of the interpretation of the touch screen input, where this is indicative of a player input, the game controller controls game play responsive to the player input, and where the data indicative of the interpretation of the touch screen input, where this is indicative of an input other than a player input, the game controller determines a response action based on the data indicative of the interpretation of the touch screen input and data representative of one or more attributes of the detected touch input.

Clause 7. The gaming machine of clause 6, wherein interpreting the touch screen input includes assessing whether a touch input is a valid or invalid touch input.

Clause 8. The gaming machine of clause 7, wherein the data indicative of the interpretation of the touch screen input includes an indicator of whether the touch input is assessed as valid or invalid.

Clause 9. The gaming machine of clause 6, wherein the gaming controller is configured to assess the touch input as valid or invalid in the context of the game play.

Clause 10. The gaming machine of clause 8 or 9, wherein the gaming machine is configured to perform one or more remediation actions in response to an invalid touch input.

Clause 11. The gaming machine of clause 10, wherein the one or more attributes of the detected touch input include any one or more of: touch area, touch shape, touch dimensions, touch edge coordinates, touch intensity, timing, and touch persistence.

Clause 12. The gaming machine of clause 10 or 11, wherein the game controller is configured to log touch data.

Clause 13. The gaming machine of clause 10, 11 or 12, wherein the game controller is configured to assess severity metrics of a touch input error and preform one or more controlled remediation actions based on the severity metrics.

Clause 14. The gaming machine of any one of clauses 10 to 13 wherein the game controller is programmed to convert touch data for invalid touch inputs to a visual representation to visually displaying location of touch errors.

Clause 15. A method of operating a gaming machine, the gaming machine comprising:

a game controller; and a touch screen system comprising:

touch screen device hardware; and a touch screen controller in data communication with a game controller of a gaming machine, the method comprising:

the touch screen controller:

receiving video data signals from the game controller;

driving the touch screen device hardware to render and display the received video data;

detecting and interpreting touch inputs received via the touch screen device hardware during display of the video data to generate touch data for each touch input; and outputting touch data to the game controller;

wherein the touch data output to the controller for each touch input includes: data indicative of the interpretation of the touch screen input; and data representative of one or more attributes of the detected touch input, and the game controller:

receiving touch data from the game controller, and where the data indicative of the interpretation of the touch screen input is indicative of a player input, controlling game play responsive to the player input, and where the data indicative of the interpretation of the touch screen input is indicative of an input other than a player input, determining a response action based on the data indicative of the interpretation of the touch screen input and data representative of one or more attributes of the detected touch input.

What is claimed is:

1. A gaming machine touch screen system comprising:

touch screen device hardware; and a touch screen controller configured for data communication with a game controller of a gaming machine, the touch screen controller being configured to:

receive video data signals from the game controller;

drive the touch screen device hardware to render and display the received video data;

detect and interpret touch inputs received via the touch screen device hardware during display of the video data to generate touch data for each touch input, wherein the touch data indicates, for each touch input, that the touch input is valid when the touch input is determined to be intentional and that the touch input is invalid when the touch input is determined to be unintentional;

output touch data to the game controller, wherein the touch data output to the game controller for each touch input includes: (i) data indicative of an interpretation of the touch screen input including an indication that the touch input is valid or invalid; and (ii) data representative of one or more attributes of the detected touch input;

store a mapping of locations of touch inputs indicated as being invalid over a period of time;

identify (i) at least one persistent invalid touch input location based on the mapping, and (ii) at least one instruction for remediation associated with the at least one persistent invalid touch input location; and cause the touch screen device hardware to display the at least one instruction.

2. The gaming machine touch screen system of claim 1, wherein interpreting the touch screen input includes assessing whether a touch input is a valid or invalid touch input based on one or more of dimensions of the touch input, edge data of the touch input, intensity of the touch input, timing of the touch input, duration of the touch input, or persistence of the touch input.

3. The gaming machine touch screen system of claim 2, wherein the touch screen controller is configured to output touch data to the game controller for all valid and invalid touch inputs.

4. The gaming machine touch screen system of claim 1, wherein the one or more attributes of the detected touch input include any one or more of: touch area, touch shape, touch dimensions, touch edge coordinates, touch intensity, timing, and touch persistence.

5. A gaming machine comprising:
a game controller; and
a touch screen system comprising:
    touch screen device hardware; and
    a touch screen controller in data communication with the game controller of the gaming machine, the touch screen controller being configured to:
        receive video data signals from the game controller;
        drive the touch screen device hardware to render and display the received video data;
        detect and interpret touch inputs received via the touch screen device hardware during display of the video data to generate touch data for each touch input, wherein the touch data indicates, for each touch input, that the touch input is valid when the touch input is determined to be intentional and that the touch input is invalid when the touch input is determined to be unintentional; and
        output touch data to the game controller, wherein the touch data output to the controller for each touch input includes: (i) data indicative of an interpretation of the touch screen input including an indication that the touch input is valid or invalid; and (ii) data representative of one or more attributes of the detected touch input;
        store a mapping of locations of touch inputs indicated as being invalid over a period of time;
        identify (i) at least one persistent invalid touch input location based on the mapping, and (ii) at least one instruction for remediation associated with the at least one persistent invalid touch input location; and
        cause the touch screen device hardware to display the at least one instruction,
    wherein
        where the data indicative of an interpretation of the touch screen input is indicative of a player input, the game controller controls game play responsive to the player input,
        where the data indicative of an interpretation of the touch screen input is indicative of an input other than a player input, the game controller determines a response action based on the data indicative of the interpretation of the touch screen input and data representative of one or more attributes of the detected touch input.

6. The gaming machine of claim 5, wherein interpreting the touch screen input includes assessing whether a touch input is a valid or invalid touch input based on one or more of dimensions of the touch input, edge data of the touch input, intensity of the touch input, timing of the touch input, duration of the touch input, or persistence of the touch input.

7. The gaming machine of claim 5, wherein the gaming controller is configured to assess the touch input as valid or invalid in a context of the game play.

8. The gaming machine of claim 5, wherein the gaming machine is configured to perform one or more remediation actions in response to an invalid touch input based on the mapping of locations of touch inputs indicated as being invalid over the period of time.

9. The gaming machine of claim 8, wherein the one or more attributes of the detected touch input include any one or more of: touch area, touch shape, touch dimensions, touch edge coordinates, touch intensity, timing, and touch persistence.

10. The gaming machine of claim 9, wherein the game controller is configured to log touch data.

11. The gaming machine as claimed in claim 8, wherein the game controller is configured to assess severity metrics of a touch input error and perform one or more controlled remediation actions based on the severity metrics.

12. The gaming machine as claimed in claim 8 wherein the game controller is programmed to convert touch data for invalid touch inputs to a visual representation to visually displaying location of touch errors.

13. A computer-implemented method of operating a gaming machine, the gaming machine comprising:
a game controller; and
a touch screen system comprising:
    touch screen device hardware; and
    a touch screen controller in data communication with the game controller of the gaming machine,
the method comprising:
    the touch screen controller:
        receiving video data signals from the game controller;
        driving the touch screen device hardware to render and display the received video data;
        detecting and interpreting touch inputs received via the touch screen device hardware during display of the video data to generate touch data for each touch input, wherein the touch data indicates, for each touch input, that the touch input is valid when the touch input is determined to be intentional and that the touch input is invalid when the touch input is determined to be unintentional; and
        outputting touch data to the game controller, wherein the touch data output to the game controller for each touch input includes: (i) data indicative of an interpretation of the touch screen input including an indication that the touch input is valid or invalid; and (ii) data representative of one or more attributes of the detected touch input;
        storing a mapping of locations of touch inputs indicated as being invalid over a period of time;
        identifying (i) at least one persistent invalid touch input location based on the mapping, and (ii) at least one instruction for remediation associated with the at least one persistent invalid touch input location; and
        causing the touch screen device hardware to display the at least one instruction.

14. The method of claim 13, wherein detecting and interpreting touch inputs further comprises outputting touch data to the game controller, where the game controller is configured to (i) receive the touch data from the touch screen controller, and (ii) where the data indicative of an interpretation of the touch screen input is indicative of a player input, control game play responsive to the player input.

15. The method of claim 14, wherein the data indicative of an interpretation of the touch screen input is indicative of an input other than a player input, determining a response action based on the data indicative of the interpretation of the touch screen input and data representative of one or more attributes of the detected touch input.

16. The method of claim 13 further comprising determining whether the touch input is valid or invalid in a context of the game play based on one or more of dimensions of the touch input, edge data of the touch input, intensity of the touch input, timing of the touch input, duration of the touch input, or persistence of the touch input.

17. The method of claim 13 further comprising performing one or more remediation actions in response to an invalid touch input.

\*  \*  \*  \*  \*